(12) United States Patent
Coustry et al.

(10) Patent No.: US 7,704,370 B2
(45) Date of Patent: Apr. 27, 2010

(54) PROCESS FOR JOINTLY OBTAINING A CHLORINE DERIVATIVE AND CRYSTALS OF SODIUM CARBONATE

(75) Inventors: Francis Coustry, Alsemberg (BE); Michel Hanse, Nivelles (BE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 11/908,029

(22) PCT Filed: Mar. 7, 2006

(86) PCT No.: PCT/EP2006/060499

§ 371 (c)(1),
(2), (4) Date: Feb. 22, 2008

(87) PCT Pub. No.: WO2006/094968

PCT Pub. Date: Sep. 14, 2006

(65) Prior Publication Data

US 2009/0041651 A1 Feb. 12, 2009

(30) Foreign Application Priority Data

Mar. 8, 2005 (FR) ................... 05 02317

(51) Int. Cl.
*C25B 1/34* (2006.01)
*C01D 7/07* (2006.01)
*C07C 17/10* (2006.01)
(52) U.S. Cl. .............. 205/516; 23/302 T; 423/190; 423/421; 570/230

(58) Field of Classification Search .............. 423/429, 423/421, 190; 23/302 T; 205/461, 516; 570/230

See application file for complete search history.

(56) References Cited

U.S. PATENT DOCUMENTS

| 3,660,261 | A | * | 5/1972 | Wright et al. | ............ 205/560 |
| 3,826,710 | A | * | 7/1974 | Anderson | ............ 162/36 |
| 3,855,397 | A | * | 12/1974 | Hoffman et al. | ............ 423/422 |
| 4,647,351 | A | | 3/1987 | Gelb et al. | |
| 2008/0193365 | A1 | * | 8/2008 | Coustry et al. | ............ 423/421 |

FOREIGN PATENT DOCUMENTS

FR    2 373 614    7/1978

OTHER PUBLICATIONS

U.S. Appl. No. 11/817,736, filed Sep. 4, 2007, Coustry et al.

* cited by examiner

*Primary Examiner*—Wayne Langel
*Assistant Examiner*—Syed Iqbal
(74) *Attorney, Agent, or Firm*—Oblon, Spivak, McClelland, Maier & Neustadt, L.L.P.

(57) ABSTRACT

An aqueous solution of sodium chloride is electrolyzed in a cell (1) with an ion permselective membrane to produce, on the one hand, chlorine (16) which is converted in a chlorine production unit (6) and, on the other, an aqueous sodium hydroxide solution (19), which is carbonated using a flue gas (13) from an electricity and steam cogeneration unit (5), and the resulting carbonated solution (18) is evaporated to produce sodium carbonate crystals (21).

15 Claims, 1 Drawing Sheet

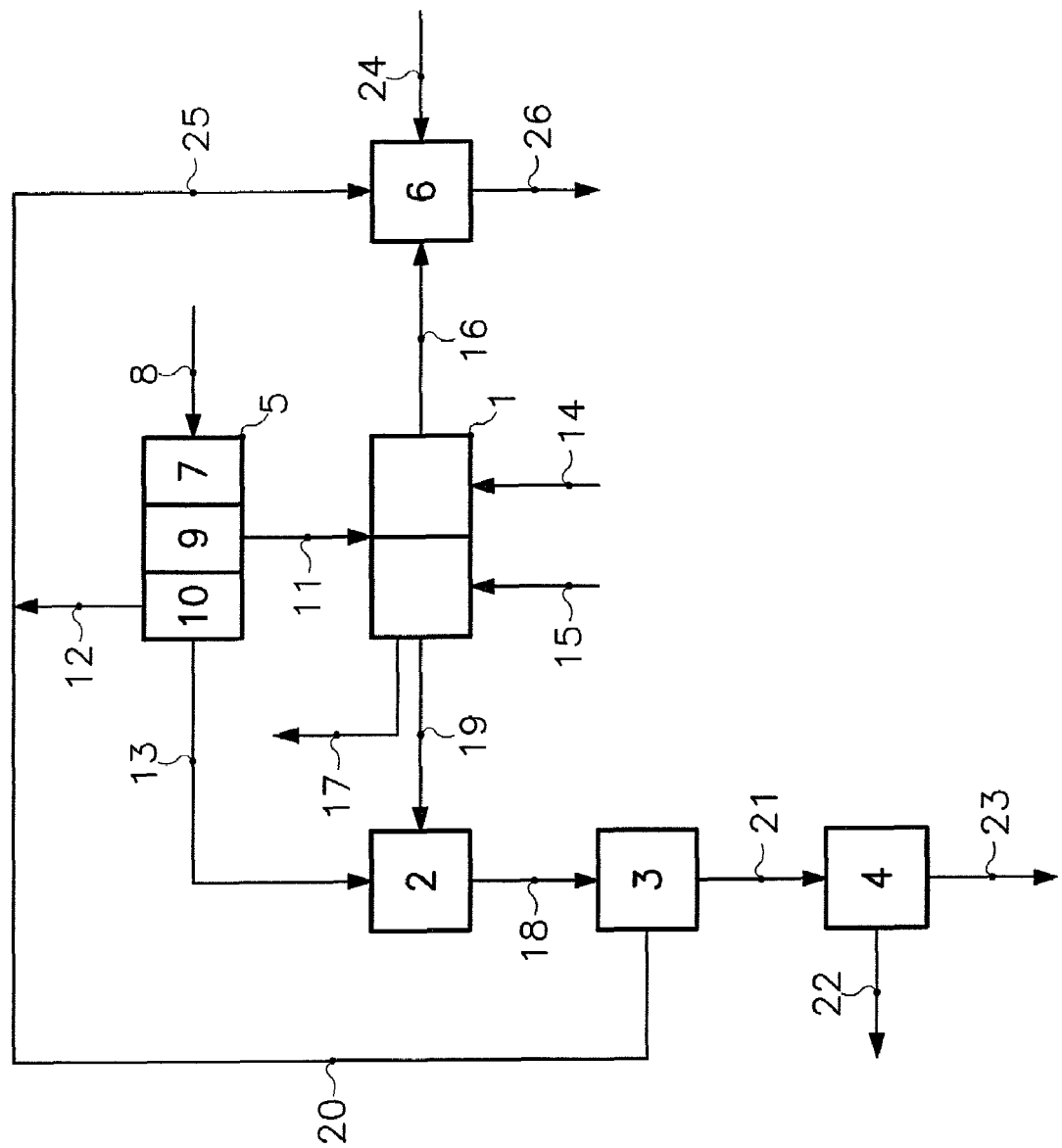

PROCESS FOR JOINTLY OBTAINING A CHLORINE DERIVATIVE AND CRYSTALS OF SODIUM CARBONATE

This application is a 371 of PCT/EP06/60499, filed Mar. 7, 2006.

The invention relates to an integrated process for jointly obtaining a chlorine derivative and sodium carbonate crystals. It relates more particularly to an integrated process for jointly obtaining a chlorine derivative and sodium carbonate crystals that is designed to reduce the emissions of carbon dioxide into the environment.

The problems associated with the excessive production of carbon dioxide by human industry are now well known. It is commonly acknowledged that the sustainable development of the planet necessarily entails the control and indeed reduction of these emissions.

Furthermore, alkali metal carbonates and sodium carbonate in particular are very widespread industrial products, with many applications. In the glass industry, sodium carbonate is an essential ingredient for easier processing of the glass. The detergent, textile and pulp and paper industries are also examples of industries consuming a large quantity of sodium carbonate.

The Solvay or ammonia process is widely used for the industrial production of sodium carbonate. This known industrial process makes considerable use of steam, the production of which generates large quantities of carbon dioxide, which are usually released into the atmosphere.

An attempt has also been made to produce sodium carbonate by carbonation of aqueous sodium hydroxide solutions produced in electrolysis cells. However, this known process is a large consumer of electricity, of which the production in thermal power plants also generates large quantities of carbon dioxide.

It is the object of the invention to reduce the releases of gases containing carbon dioxide into the atmosphere.

A more particular object of the invention is to supply a novel process for producing sodium carbonate, which reduces the carbon dioxide releases into the atmosphere.

Another object of the invention is to provide an integrated process for the joint production of sodium carbonate and a chlorine derivative, with the particular advantage of a reduced, indeed substantially zero, emission of carbon dioxide into the atmosphere.

As a consequence, the invention relates to an integrated process for the joint production of sodium carbonate and a chlorine derivative according to which an aqueous sodium chloride solution is electrolysed in a cell with a membrane selectively permeable to ions in order to produce, on the one hand, chlorine which is converted in a chlorine derivative production unit and, on the other, an aqueous solution comprising sodium hydroxide, the aqueous solution comprising sodium hydroxide is carbonated, the resulting carbonated aqueous solution is evaporated to produce sodium carbonate crystals, which are separated, and a mother liquor. According to the invention, the process is characterized in that the carbonation is carried out, at least partly, using carbon dioxide present in a flue gas issuing from a cogeneration unit supplying the integrated process with electricity and/or with steam.

In the process according the invention, the cell with an ion permselective membrane is an electrolytic cell comprising at least one anode chamber and at least one cathode chamber separated by at least one membrane substantially impermeable to liquids (mainly aqueous solutions), but selectively permeable to ions. Membrane-type electrolytic cells are well known in the prior art and commonly used for producing aqueous sodium hydroxide solutions by the electrolysis of aqueous sodium chloride solutions.

The sole FIGURE of the drawing schematically shows a practical embodiment of the aspects of the invention.

In the process according to the invention, it is preferable for the membrane of the cell to be cation permselective. By definition, when a membrane is contacted with an electrolyte between an anode and a cathode, it is crossed by cations of the electrolyte but is substantially impermeable to the transfer of anions.

In this preferred embodiment of the invention, the aqueous sodium chloride solution is introduced into the anode chamber of the cell and the aqueous sodium hydroxide solution is generated in the cathode chamber of the cell. Simultaneously, chlorine is produced in the anode chamber and hydrogen is produced in the cathode chamber.

In the process according to the invention, the membrane-type electrolytic cell is connected to a unit for producing a chlorine derivative, so that at least part of the chlorine generated in the electrolytic cell is used to synthesize the chlorine derivative. The chlorine derivative may be an organic derivative or an inorganic derivative.

In the process according to the invention, the sodium hydroxide solution is carbonated and the aqueous solution obtained from this carbonation is subjected to evaporation in order to crystallize sodium carbonate.

In the present invention, the expression "sodium carbonate" has a broad definition that includes anhydrous sodium carbonate and hydrated sodium carbonate. The acid carbonate or sodium bicarbonate ($NaHCO_3$) is excluded from the definition of the invention.

According to the invention, the aqueous sodium hydroxide solution is carbonated, at least partly, by direct contact with a flue gas (containing carbon dioxide), issuing from an electricity and steam cogeneration unit.

Electricity and steam cogeneration units are well known in the prior art and widely used in industry. They generally comprise AC generators coupled with heat engines (usually gas turbines) from which the burnt gases are sent to boilers to produce steam, and then discharged. The cold gases (or flue gases) collected downstream of the boilers contain large quantities of carbon dioxide. According to the invention, these flue gases are used to carbonate the aqueous sodium hydroxide solution produced in the membrane cell.

All appropriate means can be used for the direct contacting of the aqueous sodium hydroxide solution with the flue gas. In a particular embodiment of the invention, it is especially recommended to circulate the aqueous sodium hydroxide solution in countercurrent flow to the flue gas, in a reactor comprising a tower consisting of the stack of at least two superposed segments, separated by a partition perforated with at least two openings, the segments comprising at least one transverse wall for causing convection of the suspension in the said segment. Such a reactor facilitates and accelerates the reaction of the gas with the liquid and, consequently, the crystallization of the sodium carbonate.

In a preferred embodiment of the process according to the invention, the aqueous solution containing sodium hydroxide is essentially free of carbonate and/or bicarbonate ions when directly contacted with the flue gas. In this embodiment of the invention, it is therefore explicitly avoided to subject the said aqueous solution to carbonation or partial bicarbonation before contacting it directly with the flue gas.

In the process according to the invention, the carbonated solution is a solution containing dissolved carbonate ions. The carbonated solution may optionally contain sodium carbonate crystals, although this is not indispensable for the implementation of the process.

In a particular embodiment of the invention, it is preferable for the carbonated solution to be a slurry of sodium carbonate crystals.

The evaporation of the carbonated solution has the function of causing or preferably continuing the crystallization of sodium carbonate. It is normally carried out in an evaporator-crystallizer. A multistage evaporator or a mechanical vapour recompression evaporator is advantageously used. According to the operating conditions employed for evaporation, anhydrous sodium carbonate or hydrated sodium carbonate is crystallized.

On completion of evaporation, an aqueous slurry of sodium carbonate crystals is collected. This is normally subjected to an appropriate separation, which may, for example, comprise settling, spin drying, filtration, or a combination of these three mechanical separation means.

The mother liquor collected from the mechanical separation essentially consists of an aqueous sodium carbonate solution. It may advantageously be used to purify the above-mentioned aqueous sodium chloride solution, feeding the membrane-type electrolytic cell.

In an advantageous embodiment of the invention, the electrolysis in the membrane-type cell is regulated so that the aqueous sodium hydroxide solution contains 25 to 40 (preferably 30 to 35) % by weight of sodium hydroxide, and the carbonation and evaporation conditions are regulated to crystallize sodium carbonate monohydrate ($Na_2CO_3.H_2O$). In this embodiment, the aqueous sodium hydroxide solution is normally carbonated at a temperature above 35° C. and lower than 107.5° C. at standard atmospheric pressure. Temperatures above 50 (preferably above 70)° C. and lower that 100 (preferably 90)° C. are advantageously used. Temperatures from 75 to 85° C. are especially preferred. The crystallization of sodium carbonate monohydrate is an advantage for the subsequent production of concentrated caustic soda.

In the process according to the invention, the carbonation of the aqueous sodium hydroxide solution can be carried out entirely by the carbon dioxide from the flue gas. As a variant, a fraction of the carbonation can be effected by another means, for example, another gas containing carbon dioxide. In this variant of the invention, the gas containing carbon dioxide may advantageously be obtained by decomposition of limestone using an aqueous hydrochloric acid solution. This aqueous hydrochloric acid solution may advantageously be obtained by dissolving, in water, hydrogen chloride produced by reacting chlorine with hydrogen produced in the membrane-type electrolytic cell.

However, it is recommended that the flue gas issuing from the cogeneration unit supplies at least 25 mol % (preferably 50 mol %) of the carbon dioxide necessary to carbonate all the sodium hydroxide in the solution. It is preferable for the entire carbonation to be effected with the carbon dioxide in the flue gas.

In the process according to the invention, part or all of the electricity produced in the cogeneration unit can be used to supply the membrane-type electrolytic cell.

In a particular embodiment of the process according to the invention, at least part of the steam produced in the cogeneration unit is used to evaporate the carbonated aqueous solution. In this particular embodiment of the invention, a multistage evaporator or a mechanical vapour recompression evaporator is advantageously used, which is supplied with the steam produced in the cogeneration unit.

In another particular embodiment of the process according to the invention, at least part of the steam produced in the cogeneration unit is used in the unit for producing the chlorine derivative. This embodiment of the invention finds a specially advantageous application for the production of chlorine derivatives selected from vinyl chloride, vinylidene chloride, polyvinyl chloride and polyvinylidene chloride.

In the process according to the invention, a dilute brine of sodium chloride is collected from the membrane-type electrolytic cell. This brine may be discharged or used in another production unit.

In a preferred embodiment of the invention, the dilute brine collected from the membrane-type cell is recycled to the anode chamber of the cell, after having been purified and concentrated with sodium chloride. Purification commonly and conventionally comprises a dechlorination, a dechlorataion and a desulphation. To concentrate the dilute brine, solid sodium chloride, for example rock salt, can be added to it. It is preferable to circulate it through a rock salt deposit.

If rock salt is used to concentrate the dilute brine in the electrolytic cell, the concentrated brine must be stripped, particularly of calcium ions, magnesium ions and sulphate ions. To strip the concentrated brine of calcium ions, it can advantageously be treated with a fraction of the mother liquor from the sodium carbonate crystallization. To strip it of magnesium ions, it can be treated with a fraction of the aqueous sodium hydroxide solution produced in the electrolytic cell.

The process according to the invention presents an original solution for reducing carbon dioxide emissions into the atmosphere. It has the additional advantage of reducing the cost of producing the sodium carbonate and the chlorine derivative.

Particular features and details of the invention will appear from the following description of the single FIGURE in the drawing appended hereto, which is a schematic drawing of an installation for implementing a particular embodiment of the process according to the invention.

The installation shown schematically in the FIGURE comprises an electrolytic cell (1), a carbonation tower (2), an evaporator-crystallizer (3), a spin-drying chamber (4), a cogeneration unit (5) and a vinyl chloride production unit (6).

The electrolytic cell (1) is of the type with cation permselective membranes. It comprises anode chambers and cathode chambers that are separated from the anode chambers by cation permselective membranes. The cell may be of the single-pole or two-pole type.

Cells with cation permselective membranes are well known in electrolytic technique and widely used for the industrial production of aqueous sodium hydroxide solutions from brines or aqueous sodium chloride solutions.

The cogeneration installation conventionally comprises a gas turbine (7), supplied with natural gas (8), an AC generator (9) and a boiler (10) supplied with gases from the gas turbine. The AC generator (9) coupled to a rectifier (not shown) and the latter is connected (11) to the electrolytic cell (1) to supply it with electric power. Superheated steam (12) from the boiler and a flue gas (13) rich in carbon dioxide, are collected.

An aqueous solution (14) substantially saturated with sodium chloride is introduced into the anode chambers of the electrolytic cell (1) and water (15) into the cathode chambers of the cell. During electrolysis, chlorine (16) is generated in the anode chambers of the cell and extracted therefrom. Simultaneously, hydrogen (17) and an aqueous sodium hydroxide solution (19) are produced in the cathode chambers and extracted therefrom.

The aqueous sodium hydroxide solution (19) and the flue gas (13) are sent to the carbonation tower (2), where they are circulated in countercurrent flow and in contact with each other. To intensify the contact of the flue gas with the aqueous solution and, consequently, the yield of the reaction between the carbon dioxide in the flue gas and the solution, the column consists of the stack of several segments, separated by substantially horizontal or slightly inclined partitions. Each partition is perforated with an opening near its periphery, for the downflow of the solution, and with one or a plurality of openings in its central zone, for the upflow of the flue gas. The segments are further compartmentalized by vertical partitions forming baffles for the circulation of the solution.

A temperature of about 80° C. is produced in the carbonation tower (2) in order to crystallize sodium carbonate monohydrate.

An aqueous slurry of sodium carbonate monohydrate crystals (18) is collected in the carbonation tower (2), and immediately sent to the evaporator-crystallizer (3). The latter is advantageously an evaporator of the mechanical vapour recompression type. It is supplied with a fraction (20) of the steam (12) from the cogeneration unit (5).

In the evaporator-crystallizer (3) the slurry (18) is subjected to controlled evaporation to crystallize sodium carbonate. Evaporation is normally effected at low pressure, at a temperature corresponding to the crystallization of the sodium carbonate in monohydrate form. The slurry (21) collected from the evaporator-crystallizer (3) is sent to the spin-drying chamber (4) where the crystals of sodium carbonate monohydrate (22) and a mother liquor (23) are separated. The crystals of sodium carbonate monohydrate (22) are sent to an installation for producing concentrated caustic soda, not shown.

The polyvinyl chloride production unit (6) is supplied with chlorine (16), ethylene (24) and another fraction (25) of the steam (12) generated in the cogeneration unit (5). Vinyl chloride is produced in the unit (6), then polymerized, and polyvinyl chloride (26) is collected.

The invention claimed is:

1. An integrated process for the joint production of sodium carbonate and a chlorine derivative according to which an aqueous sodium chloride solution is electrolysed in a cell with an ion permselective membrane in order to produce, on the one hand, chlorine which is converted in a chlorine derivative production unit and, on the other, an aqueous solution comprising sodium hydroxide, the aqueous solution comprising sodium hydroxide is carbonated, the resulting carbonated aqueous solution is evaporated to produce sodium carbonate crystals, which are separated, and a mother liquor, characterized in that the carbonation is carried out, at least partly, using carbon dioxide present in a flue gas issuing from a cogeneration unit supplying the integrated process with electricity and/or with steam,
wherein at least a part of a steam produced in a cogeneration unit is used to evaporate the carbonated aqueous solution.

2. The process according to claim 1, wherein the aqueous sodium carbonate solution is evaporated in an evaporator-crystallizer selected from multistage evaporators and mechanical vapour recompression evaporators.

3. The process according to claim 1, wherein at least a part of a steam produced in the cogeneration unit is used in the chlorine derivative production unit for producing the chlorine derivative.

4. The process according to claim 1, wherein the carbonation is carried out by direct contact between the flue gas and the aqueous solution comprising sodium hydroxide, under conditions that cause the conversion of the aqueous solution to an aqueous slurry of crystals of a sodium carbonate.

5. The process according to claim 4, wherein the direct contacting of the flue gas with the aqueous sodium hydroxide solution is effected by circulating the said solution in countercurrent flow to the flue gas in a tower consisting of the stack of at least two superposed segments separated by a partition perforated with at least two openings, the segments comprising at least one transverse wall for causing convection of the suspension in the said segment.

6. The process according to claim 1, wherein the aqueous solution comprising sodium hydroxide is essentially free of (bi)carbonate ions when directly contacted with the carbon dioxide.

7. The process according to claim 1, wherein the electrolysis is regulated so that the aqueous sodium hydroxide solution comprises about 32% by weight of sodium hydroxide, and the operating conditions of the carbonation are regulated so that the carbonated aqueous solution contains crystals of sodium carbonate monohydrate.

8. The process according to claim 1, wherein the aqueous sodium carbonate solution is evaporated in an evaporator-crystallizer, the operating conditions of which are regulated so that the sodium carbonate crystals resulting from evaporation are crystals of sodium carbonate monohydrate.

9. The process according to claim 1, wherein the chlorine derivative is selected from the group consisting of vinyl chloride, vinylidene chloride, polyvinyl chloride and polyvinylidene chloride.

10. The process according to claim 1, wherein the electrolysis is regulated so that the aqueous sodium hydroxide solution contains 25 to 40% by weight of sodium hydroxide.

11. The process according to claim 1, wherein the carbonation and evaporation conditions are regulated to crystallize sodium carbonate monohydrate.

12. The process according to claim 1, wherein the aqueous sodium hydroxide solution is carbonated at a temperature above 35° C. and lower than 107.5° C.

13. The process according to claim 1, wherein the aqueous sodium hydroxide solution is carbonated at a temperature above 75° C. and lower than 85° C.

14. The process according to claim 1, wherein the electrolysis is regulated so that the aqueous sodium hydroxide solution contains 30 to 35% by weight of sodium hydroxide.

15. The process according to claim 1, wherein the electrolysis is regulated so that the aqueous sodium hydroxide solution contains 25 to 40% by weight of sodium hydroxide, the carbonation and evaporation conditions are regulated to crystallize sodium carbonate monohydrate, and the aqueous sodium hydroxide solution is carbonated at a temperature above 35° C. and lower than 107.5° C.

* * * * *